United States Patent [19]
Cooper

[11] 3,941,415
[45] Mar. 2, 1976

[54] COLLAPSIBLE LIVING ENCLOSURE

[76] Inventor: Herbert Cooper, 1 Toms Point Lane, Port Washington, N.Y. 11056

[22] Filed: July 24, 1974

[21] Appl. No.: 491,547

[52] U.S. Cl. .................. 296/27; 52/66; 160/229 R; 296/137 B
[51] Int. Cl.² ............................................ B60P 3/34
[58] Field of Search.... 296/23 R, 23 C, 23 G, 23 A, 296/26, 27, 24 H, 98, 23 E, 137 R, 137 B; 52/67, 66; 160/229 R

[56] References Cited
UNITED STATES PATENTS

| | | | |
|---|---|---|---|
| 2,019,706 | 11/1935 | Hungerford | 160/229 R |
| 2,168,069 | 8/1939 | Miller | 296/23 C |
| 2,820,666 | 1/1958 | Grochmal | 296/23 C |
| 3,050,331 | 8/1962 | Mansen | 296/27 |
| 3,315,421 | 4/1967 | Roy | 296/27 |
| 3,694,022 | 9/1972 | Dontigny | 296/27 |

Primary Examiner—Robert J. Spar
Assistant Examiner—Winston H. Douglas
Attorney, Agent, or Firm—Homer J. Bridger

[57] ABSTRACT

A mobile rectangular base constituted by a motor home, trailer, or the like is overlain by a congruent cover. A foldable post is provided extending between each corner of the cover and the corresponding corner of the base so that when unfolded they rigidly support the cover well above the base. Walls constituted by a plurality of rigid panels can be pulled from the base or from the cover and slid along guides on the posts to enclose the structure. Hydraulic cylinders are provided to fold and unfold the posts so as to lower and raise the cover. When the walls are locked in place the entire assembly is rigid and self-supporting.

3 Claims, 15 Drawing Figures

COLLAPSIBLE LIVING ENCLOSURE

FIELD OF THE INVENTION

My present invention relates to a mobile living arrangement. More particularly this invention concerns a portable enclosure which is at least partially collapsible.

BACKGROUND OF THE INVENTION

A camper is known which has a mobile base adapted to be pulled trailer-fashion behind an automobile and which can be opened up so as to provide living quarters. Such a structure has walls which are made of canvas so that they are readily collapsible. The top is also often made of canvas and, even when made of rigid material, is manually lifted with difficulty into position and maintained with suitable bracing in the raised position. Such an uninsulated camper is uncomfortable in a cold or windy climate. Furthermore the flimsy structure frequently provides inadequate protection from occasional violent storms, and even invites entry by thieves and animals.

Motor homes and trailers are known which provide relatively secure and comfortable living quarters, but which are expensive and take up a considerable amount of space. Their transport and storage is a problem. Such a conventional motor home or trailer is cramped for living space, as it must be small enough to travel along conventional highways where height clearances are limiting factors.

OBJECTS OF THE INVENTION

It is therefore an object of the present invention to provide an improved mobile living enclosure.

Another object is the provision of a collapsible and portable enclosure which can be set up easily into a rigid and comfortable living arrangement.

A further object is to provide a collapsible mobile living arrangement which overcomes the aforesaid disadvantages.

SUMMARY OF THE INVENTION

These objects are attained according to the present invention in a mobile living enclosure which comprises a polygonal base overlain by a cover of similar polygonal shape. A plurality of foldable posts each have a lower end secured to the base at a respective corner and an upper end secured to the cover at the corresponding corner thereof. Actuating means is provided including preferably at least one fluid-operated cylinder connected to the posts to displace them between a folded position in which the cover lies snugly against the base and an extended position in which the cover is spaced from the base and the posts extend straight between their respective corners. Each post is provided with a pair of guides and respective retractile walls are provided which each are formed of a plurality of hinged together rigid panels having ends engageable in the guides so that when the posts are extended these walls can slide into position along the guides and form rigid side walls for the living arrangement. The walls are stored either within the base or within the collapsible superstructure.

Once the cover is lifted and the walls pulled down or up along the guides between the unfolded posts the assembly is rigid and stable. The wall panels may be insulated so that the living quarters can readily be used in cold weather. Furthermore, since these panels, which are advantageously made of inherently strong and rigid fiberglass or of an aluminum-insulation sandwich, are relatively strong in their own right, they can resist high winds easily and make forcible entry difficult. The living quarters so constituted are attractive and much more comfortable than the flimsy collapsible types known hitherto.

Such a collapsible living enclosure can be made simply as a towed trailer-type camper by providing wheels on the base so that when it is folded it does not block rearward view from the towing vehicle and presents minimum wind resistance. In addition it is possible to build the structure in accordance with my present invention on top of a conventional house trailer or motor home so as to provide a comfortable second story. Further, access can be provided either by external stairs or through congruent registering openings in the vehicle and the enclosure. Stairs or ladders can be provided either in the vehicle or in the enclosure. A collapsible cabana could be built for pool-side use or could be mounted, for example, onto a sailboat or provided with runners for use as an ice-fishing house in which case an opening would be provided in the floor for access to the ice-fishing hole. The applications are numerous and all are intended to be included within the scope of the invention. The enclosure according to the invention, for instance, can be carried on the back or side of the base structure as well as on the top. This invention includes the concept of providing it on the back of a camper so that a Murphy bed can fold down into the enclosure, thereby providing an extra bedroom in a conventional camper or trailer.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
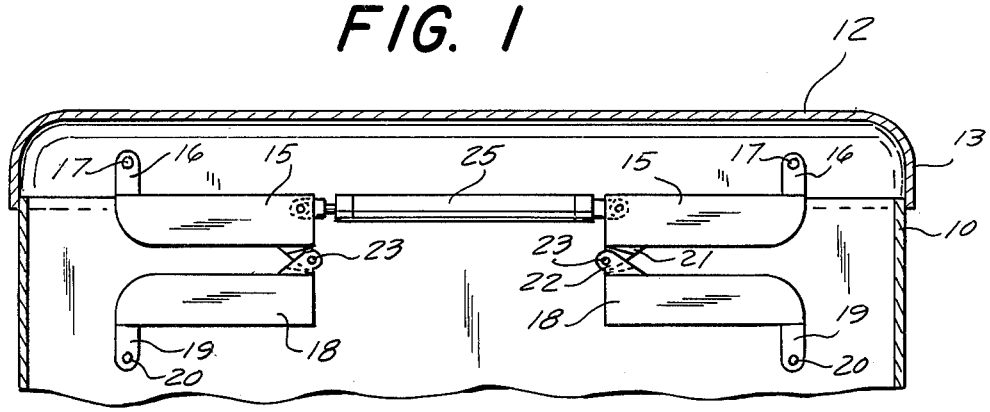
FIGS. 1 and 2 are side sectional views illustrating a top-mounted collapsible living arrangement according to this invention in the collapsed and raised positions, respectively.
Figure 2:
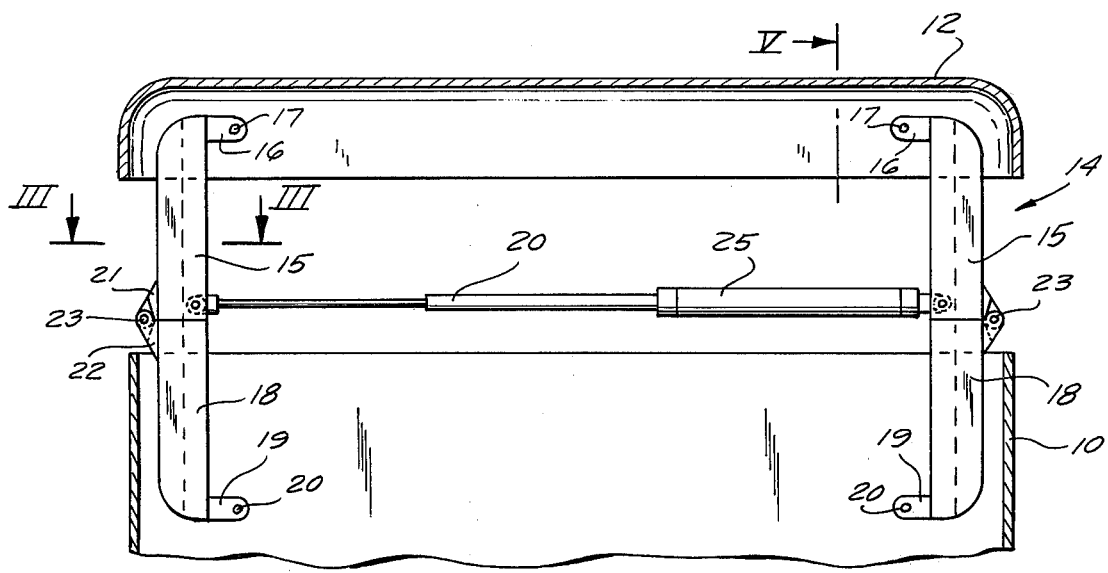

As shown in FIGS. 1 and 2 the polygonal top 10 of a house trailer is overlain by a rigid polygonal cover 12 made of sheet metal and having a downwardly extending lip 13 which can fit snugly down around the upper edge of the top 10 to make a watershedding joint. In each of the corners of the top 10 and cover 12 there is provided a two-part foldable post 14 comprising an upper section 15 having an upper end provided with a lug 16 pivoted at 17 on the cover 12 and a lower section having a lower end provided with a lug 19 pivoted at 20 on the base. The sections 15 and 18 are provided at their other ends with respective lugs 21 and 22 that are pivoted together at 23. In addition each of the upper sections 15 is provided with a respective transverse pivot pin 24 (See FIG. 3) on which is pivoted an end of a long hydraulic cylinder 25 having a piston rod 26. Four such posts 14 are operated by a pair of such cylinders 25.

In the lowered position of the cover 12 as shown in FIG. 1 the sections 15 and 18 of each post 14 are folded one on top of the other so that these sections extend inwardly from the respective corners of the base 10 parallel to a side thereof. Pressurization of the hydraulic cylinders 25 by sources not shown pushes the pivot pins 24 apart and thereby forces the posts into the straightened position shown in FIG. 2 with the cover 12 raised above the base 10.

Figure 4:
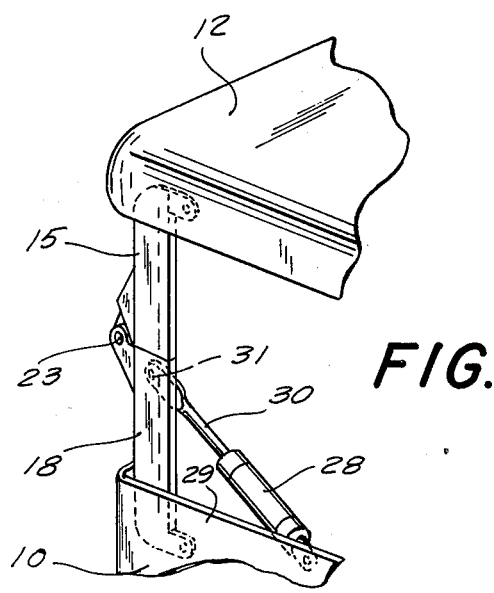
FIG. 4 is a perspective view of another type of post in accordance with the invention in the raised straight position.

The arrangement shown in FIG. 4 is identical to that of FIGS. 1 and 2 except that a single cylinder 28 pivoted on the side wall 29 of the base 10 has its piston rod 30 pivoted on a lug 31 near the upper end of the lower section 18 of the post 14. Thus each post 14 has its own actuating cylinder to displace it between the folded and extended positions. All the cylinders 28 are ganged to lift the cover 12 parallel to the top 10.

Figure 3:
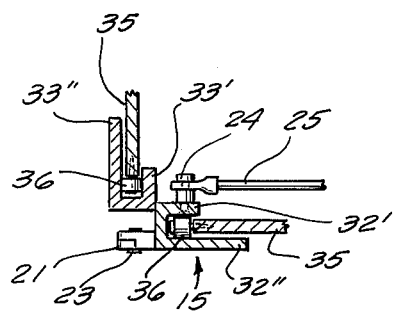
FIG. 3 is a section taken along line III—III of FIG. 2.

FIG. 3 shows how each section 15 is formed of a pair of channels 32 and 33 lying at a right angle to each other and each having one short side 32' and 33' and one long side 32'' and 33'', respectively. The sections 18 are identically made.

Figure 5:
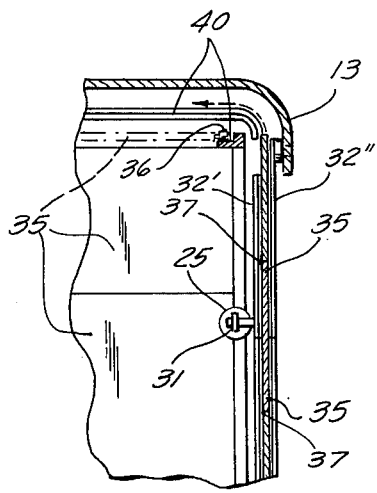
FIG. 5 is a section through the collapsed enclosure with the walls lowered.
Figure 6:
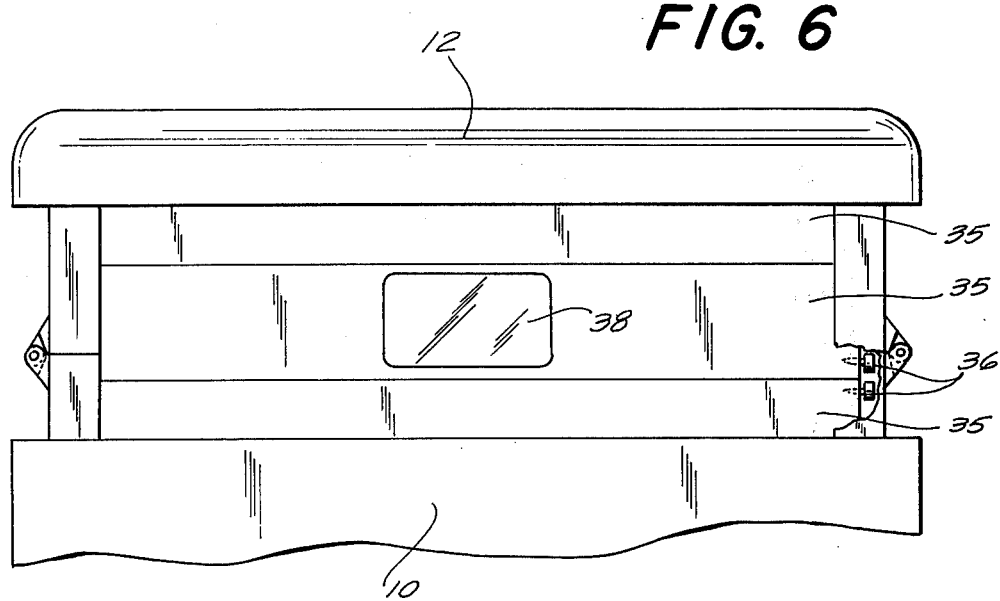
FIG. 6 is a partly sectional elevational view of the arrangement in the erected position of the top with the walls in place.

Walls 35 shown in FIGS. 5 and 6 each comprise three elongated rectangular panels 35 of insulated aluminum provided at their ends with guide rollers 36 and hinged together by piano hinges 37. A window 38 is provided in the center panel 35. When the cover is in the collapsed position shown in FIG. 1 the panels 35 are held on rails 40 just under the cover 12.

In order to close the sides of the structure when the cover 12 is lifted into the position of FIG. 2 the panels 35 are pulled down so that their rollers 36 ride in two facing channels 32 or 33 and they press tightly against the long sides 32'' and 33'' of these channels. In this lowered position of the walls 34 shown in FIGS. 5 and 6 the structure is extremely rigid, capable of withstanding considerable lateral forces. The posts 14 must bend inwardly on lowering of the top so that, since the walls 34 serve to hold these posts out, the double-acting cylinders 25 or 28 need only be pressurized to raise and lower the cover 12, the structure holding itself up when the walls are dropped down into place.

While the walls have been described as being stored in the cover when the enclosure of this invention is in the collapsed or folded position, the walls may be stored in the base and lifted and fastened after the posts are extended. While more effort may be required for positioning the walls, less effort will be required for lifting the cover. It is also possible to place the walls in part in the cover and in part in the base, as the front and rear walls in the cover with the side walls in the base.

Figures 7, 8, 9:
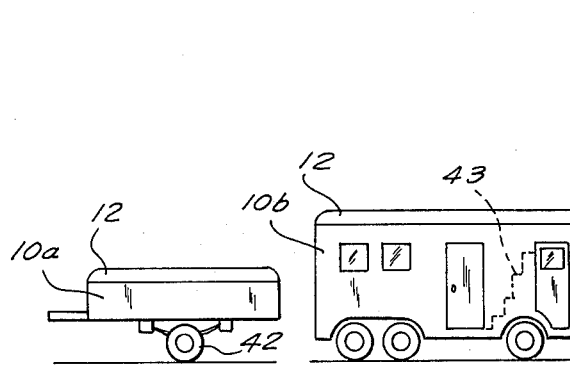
FIGS. 7–10 are side elevational views showing top-mounted enclosures according to the present invention in use.

FIG. 7 shows how a trailer-type camper base 10a having wheels 42 may be modified to support the collapsible enclosure of the invention. A motor home, i.e. a self-contained and self-propelled living quarters and vehicle, may have its roof serve as a base 10b for the cover 12. An inner stairway show in dot-dash lines at 43 serves for access to the upper story of the home 10b, this stairway extending from the "downstairs" living quarters to the "upstairs" collapsible enclosure.

Although a self-contained enclosure according to this invention may be rendered mobile by wheels, runners 41 on an ice-house base 10c as shown in FIG. 9 are also within the scope of this invention.

Figure 10:
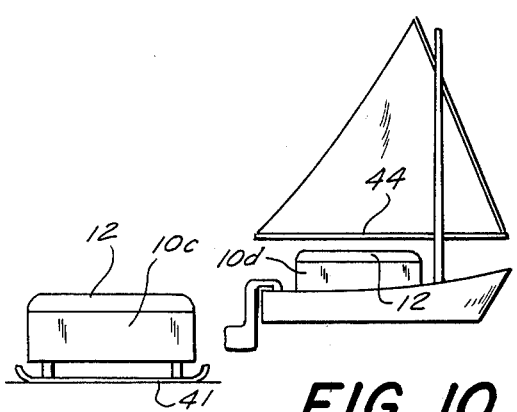

A sailboat may constitute a base 10d as shown in FIG. 10. In order to provide clearance for the boom 44 so that that the boat may be sailed the enclosure is collapsed, while once the sail is furled the enclosure may be erected. In any case it is necessary to provide the structure within the Thwarts of the boat.

In all these arrangements the living quarters can be collapsed to facilitate transport and storage of the base or to allow it to travel better if it is self-propelled as in FIGS. 8 and 10. When erected the arrangement according to this invention constitutes a rigid structure which can serve as comfortable living quarters for the owner.

Figure 11:
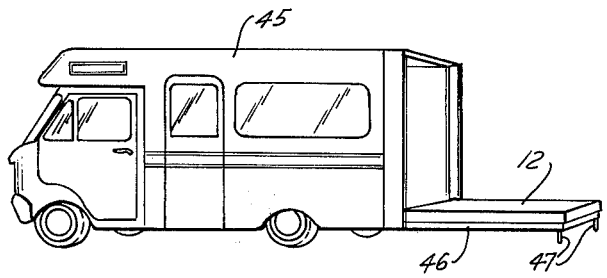
FIGS. 11–13 are perspective views illustrating three rear-mounted enclosures according to this invention.

The arrangement shown in FIG. 11 comprises a camper 45 on whose rear end is provided a collapsible enclosure referenced with the same numerals used in FIGS. 1–6 where structure is identical. A base plate 46 is pulled out of the base of the camper 45 and short jacks 47 functioning as legs are dropped down onto the ground to support the plate 46 in a level condition. In this arrangement, as also shown with reference to a camper 48 in FIG. 12, the post sections 15 and 18 are interconnected by rigid plates 49 and 50, respectively, on the same side of the enclosure. Windows 51 are provided in the upper plates 50, which are connected via piano hinges 52 to the lower plates 49.

Figure 13:
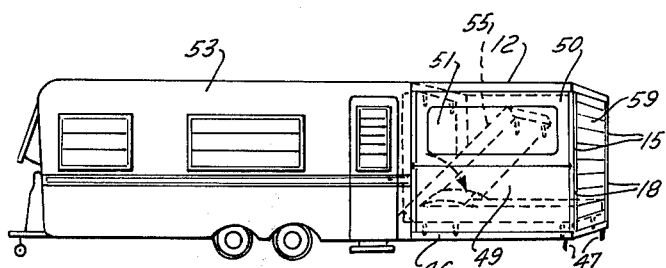

FIG. 13 shows the arrangement on the back of a trailer 53 with the side walls 49 and 50 locked in place and a back wall 54 pulled down between them so as to form a completely closed extension. A Murphy bed 55 standing in the rear end of the trailer 53 can then be dropped down into the enclosure so that even a small trailer can have adequate sleeping facilities. It is possible with this arrangement to add with little difficulty a room approximately seven feet on a side to a normally cramped camper or trailer. This allows the owner of such a portable or self-propelled vehicle to have all the advantages—good roadability, easy handling, low wind resistance, low trailer-park fees—of a small camper or trailer while still benefiting from the comfort and ease of living offered by a larger unit.

Figure 14:
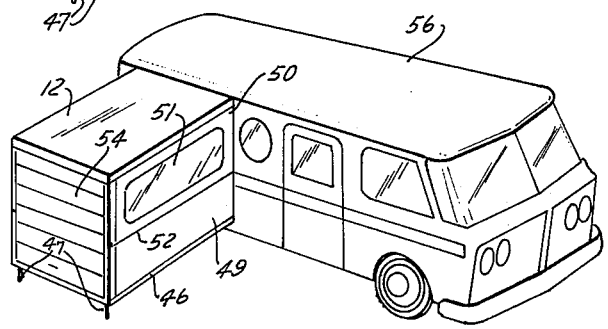
FIGS. 14 and 15 are perspective views of the two side-mounted collapsible enclosures in accordance with the present invention.
Figure 12:
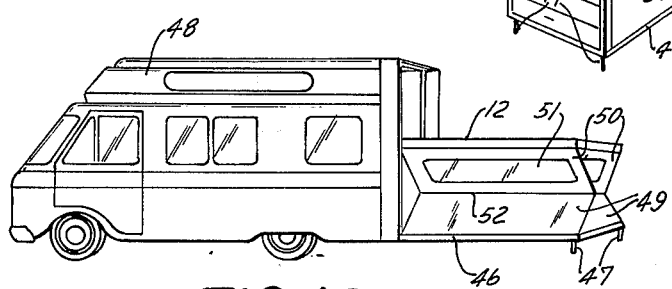

The motor home 56 shown in FIG. 14 has an arrangement identical to those shown in FIGS. 11–13, except that the base plate 46 is pulled out of the side of the vehicle. Such an extension gives an L-shaped floor plan which is much advantageous than the rear-mounted system from a decorating point of view, although the thus extended vehicle will fit with more difficulty into a conventional trailer-park slot. So long as a square floor area of the extension is used the arrangement can readily be adapted to different vehicle types.

Figure 15:
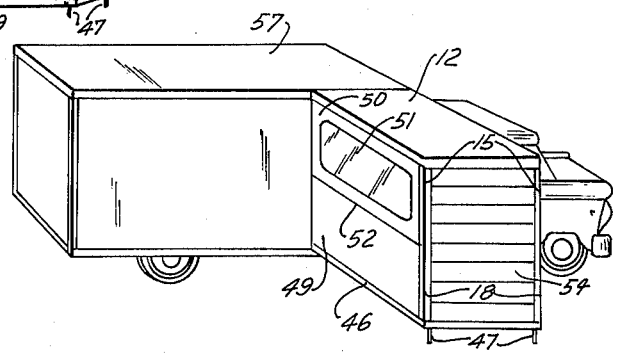

In FIG. 15 a truck 57 is shown with a side-mounted extension identical to that shown in FIGS. 11–14. In this case it is possible for a cross-country trucker to simply pull to the side of the road, open up his living extension, and spend the night in a comfortable and familiar bedroom. He remains close to his vehicle so that its hijacking is almost completely ruled out, and he can start on his way in the morning with little difficulty. The expense of a motel room is thus saved. Such an arrangement is particularly adapted for the rental trade, as many homeowners who are doing their own moving like to remain near their loads for fear of losing their possessions.

The side-mounted or rear-mounted enclosures of the type described can be used as field offices, tool sheds, mining or hunting cabins, or even emergency medical units. They allow a relatively small vehicle to be expanded into relatively spacious quarters. It is also within the scope of this invention to provide several such arrangements on a single vehicle. Thus the two sides and the top of a camper can be expanded to tripple the usable space. When used on a truck body as a simple freight container it is possible for the driver to collapse the truck back and return empty with all the wind resistance of a flatbed. The base expandable according to the present invention is particularly suited for commercial use also, as a hotdog stand or for on-the-spot promotions. Similarly mobile health-care centers so constructed can provide relatively important services from a base which can readily be collapsed and moved from place to place. All such uses lie within the scope of this invention.

I claim:

1. A mobile living enclosure comprising:

a generally polygonal mobile base having two pairs of sides meeting at corners;

a cover substantially congruent to said base and having a downwardly projecting lip engageable over and around said base;

at least a pair of two foldable posts each post having a laterally open and elongated channel-shaped lower section with a lower end pivoted on said base at a respective corner thereof, a laterally open and elongated channel-shaped upper section having an upper end pivoted on said cover at the corresponding corner thereof, and a connecting pivot between the upper end of said lower section and the lower end of said upper section, said upper and lower sections of each post being pivotally displaceable between an extended position forming a straight channel guide extending between said base and said cover and opening laterally toward the other post and a folded position with said sections generally parallel and opening laterally in opposite directions;

erecting means for each pair of posts including an extensible element having one end connected to one of said posts of the respective pair adjacent said connecting pivot thereof and another end connected to said other post of the respective pair adjacent the said connecting pivot thereof for displacing said posts between said folded position with said cover lying snugly over said base and fully enclosing said posts and said extended position with said cover spaced above said base and supported by said posts;

a retractable wall for each of said pairs of posts and formed of at least one rigid panel having opposite end edges, said walls each being displaceable between a closed position extending from a respective side of said cover to the corresponding side of said base with said end edges engaged in said channel guides in the extended positions of said posts and a retracted position permitting bending of said posts into said folded positions, whereby in said closed position of said walls said posts are prevented by said walls from being displaced into said folded positions.

2. The enclosure defined in claim 1 wherein said extensible element is a fluid-operated cylinder connected to said posts.

3. The enclosure defined in claim 1 wherein said wall is formed of a plurality of such rigid panels and has at least one hinge interconnecting said panels.

* * * * *